(12) United States Patent
Milanowski et al.

(10) Patent No.: US 6,201,922 B1
(45) Date of Patent: Mar. 13, 2001

(54) SEALED EQUIPMENT BOX HAVING AN ACCESS FOR A CABLE

(75) Inventors: Michel Milanowski, Anserville; Alain Lepeuve, Noisy le Roi; Alain Vincent, Juilly, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/281,071

(22) Filed: Mar. 9, 1999

(30) Foreign Application Priority Data

Mar. 9, 1998 (FR) .................................................. 98 02822

(51) Int. Cl.[7] .............................. G02B 6/36; H01R 13/52
(52) U.S. Cl. ............................................ 385/135; 439/271
(58) Field of Search .................................... 385/134–137, 385/147; 439/271–278, 281, 282

(56) References Cited

U.S. PATENT DOCUMENTS

| | | | |
|---|---|---|---|
| 5,313,546 | * 5/1994 | Toffetti ................................. | 385/135 |
| 5,633,973 | * 5/1997 | Vincent et al. ....................... | 385/135 |
| 5,689,607 | * 11/1997 | Vincent et al. ....................... | 385/136 |
| 5,884,002 | * 3/1999 | Cloud et al. ......................... | 385/135 |

FOREIGN PATENT DOCUMENTS 0 695 900 A1    2/1996   (EP) .

* cited by examiner

*Primary Examiner*—John D. Lee
(74) *Attorney, Agent, or Firm*—Sughrue, Mion, Zinn, Macpeak & Seas, PLLC

(57) ABSTRACT

An equipment box, in particular a splice box, including a first portion having an opening which is closed off in sealed manner by a second portion in abutment against a gasket positioned at the edge of the opening, and also a slot in the zone in which the second portion abuts against the first portion, the slot providing access for a cable via a configuration enabling the cable to be inserted transversely. A neck carried by the first portion surrounds said slot except in the direction in which the slot opens out at the edge of the opening. A sealing member formed by a sleeve is provided with a laterally projecting element providing abutment continuity for the linear gasket at the slot. The sleeve as positioned around the cable in a neck is subjected to the action of a presser device which is mounted at the end of the neck so as to compress the sleeve and a gasket fitted around the cable in the sleeve.

8 Claims, 3 Drawing Sheets

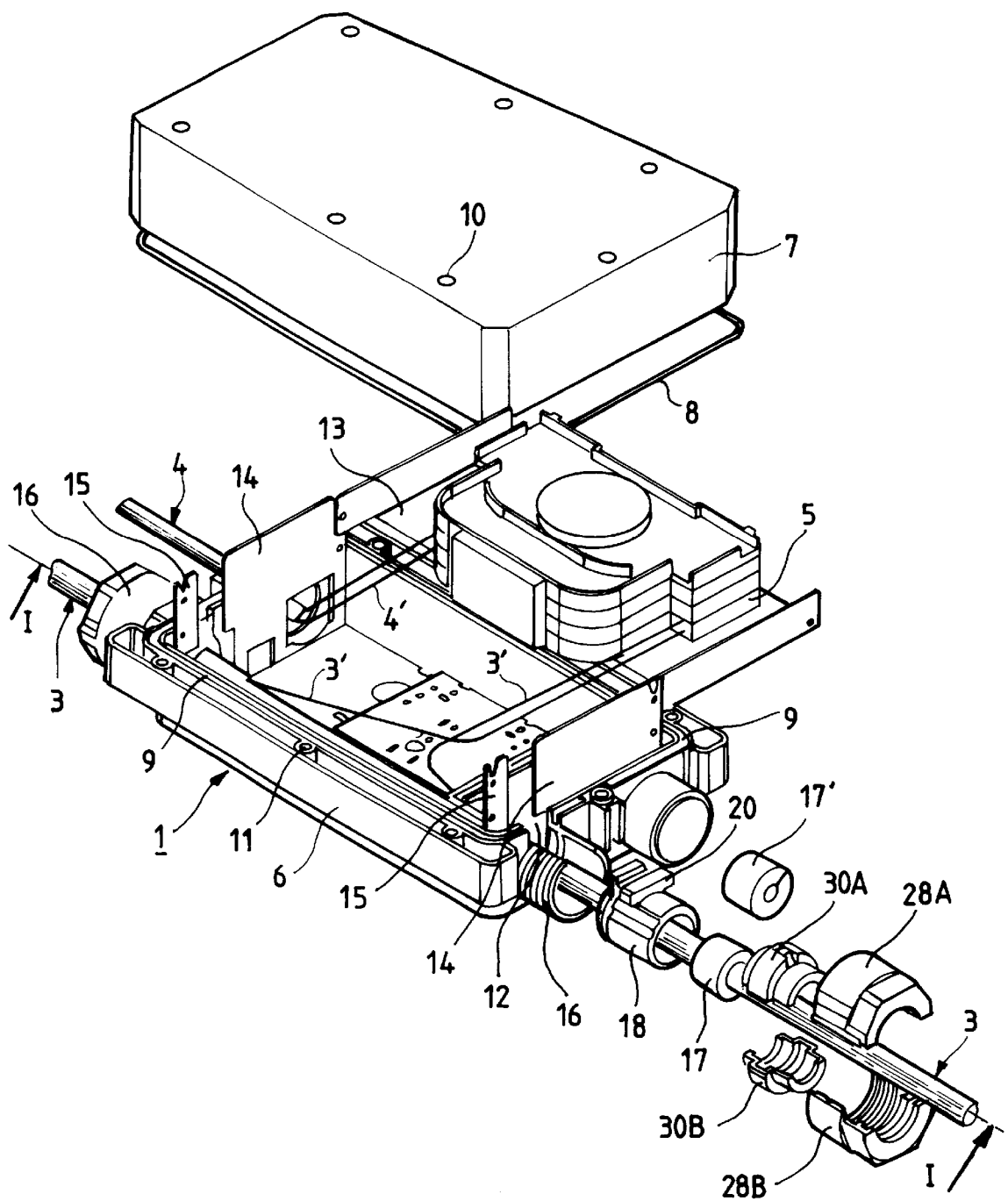
FIG_1

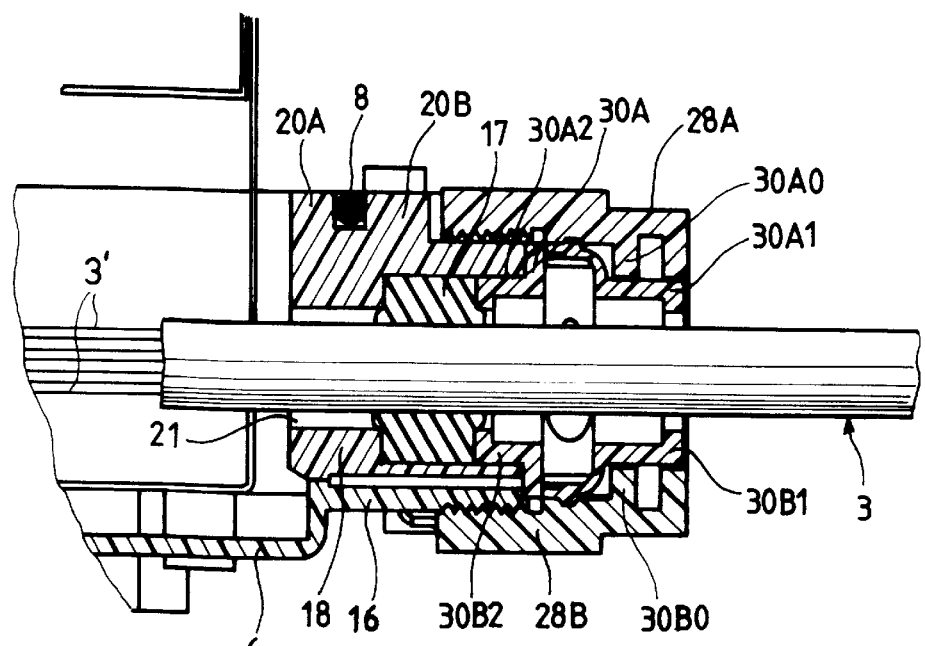
FIG_2
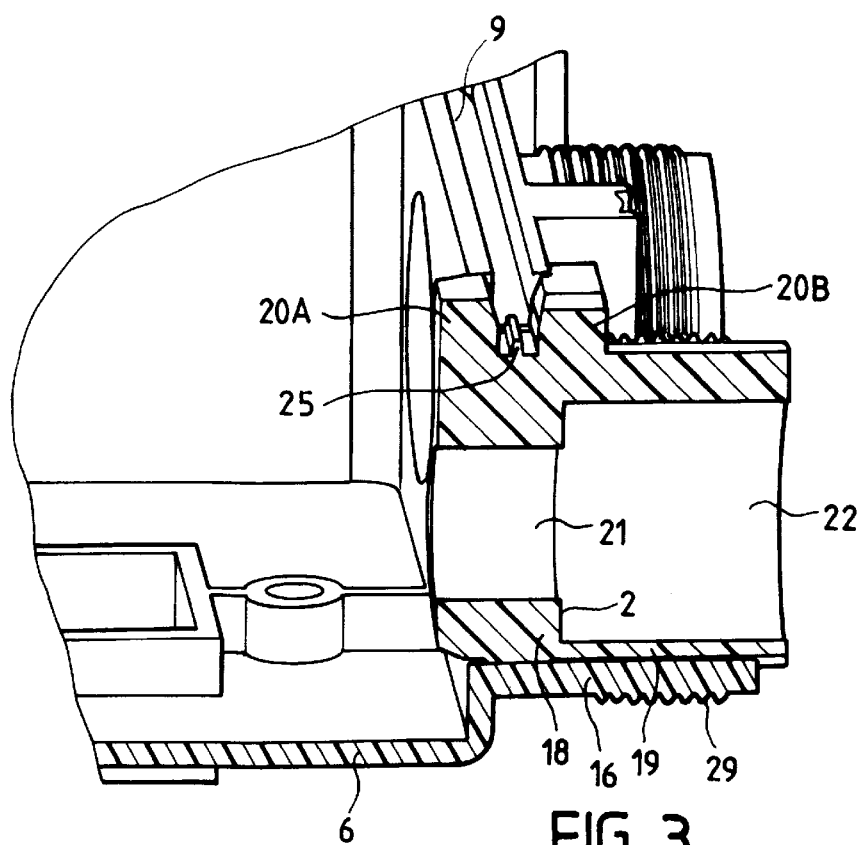
FIG_3

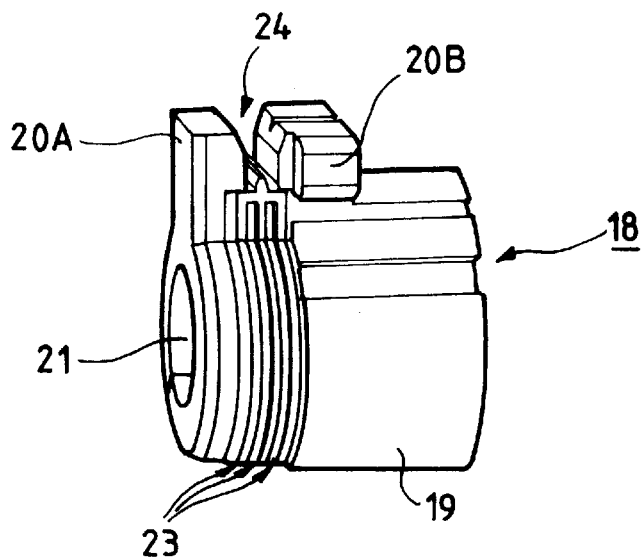
FIG_4
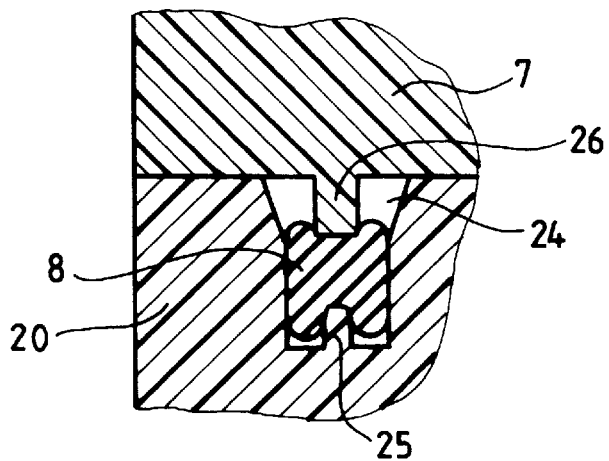
FIG_5
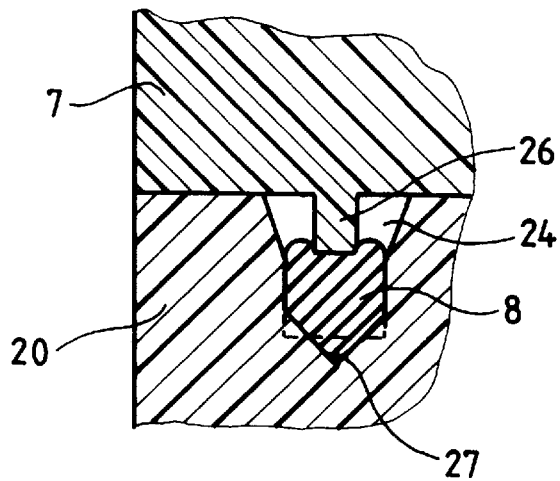
FIG_6

SEALED EQUIPMENT BOX HAVING AN ACCESS FOR A CABLE

The invention relates to sealed equipment boxes to which cables are connected, in particular electrical and/or optical telecommunications cables, and more particularly it relates to splice boxes.

BACKGROUND OF THE INVENTION

In a commonly-used form, such boxes are made up of at least two portions, one of which is, for example, a hollow body which receives at least one cable, optionally in through manner, and which houses equipment. A second portion, e.g. constituting a lid, is positioned over an access opening provided in the first portion so as to close off said opening in sealed manner. It is known that a gasket of linear appearance, optionally an endless gasket, e.g. a gasket made of an elastomer material, can be placed in the zone in which the second portion comes into abutment against the first portion, at the edge of the opening. In a conventional form, a peripheral groove for receiving a linear gasket extends around the edge of the opening of the first portion, a complementary rib provided on the second portion coming into position facing the groove so as to compress the gasket when the second portion is put in place. The second portion compressing the gasket guarantees that the box is sealed at the zone of the first portion that surrounds the opening. Naturally, the positions of the groove and of the rib may be inverted, and grooves and ribs may be combined as a function of particular needs for the purpose of obtaining good sealing.

A cable penetrating into a sealed box, as described above, involves implementing special means if the sealing of the box is to be preserved. It is known that stuffing-type means can be used in an orifice through which a cable passes and which is provided in a wall of one portion of the box, e.g. in the form of a circular hole. Unfortunately, that involves threading the cable through the orifice, which is sometimes impractical, in particular when the cable passes through the box. To avoid that drawback, it is known that provision can be made to pass a cable through a slot which opens out at the edge of an opening.

Document EP-A-695 600 discloses a cable access provided in a gasket zone between two portions that are recessed in complementary manner for this purpose. The sealing means relating to that access essentially comprise a cable clamp surrounding the cable, a gasket of cylindrical appearance through which the cable passes, and a gasket-pressing member, of the washer type. The washer is placed on the other side of the gasket from the cable clamp, and it presses the gasket against a complementary wall of a neck provided at the facing recesses in the two box portions when those portions are suitably assembled together, and when the presser member exerts pressure parallel to the axis of the cable from the cable clamp.

The means proposed in that document suffer from the drawback of requiring a relatively large number of separate parts, and of involving a relatively difficult fitting stage. In addition, the required sealing can be difficult to obtain, in particular when fins are present on the cylindrical gasket, and in particular when it is necessary to fit the sealing means on a box already installed in situ.

OBJECTS AND SUMMARY OF THE INVENTION

The invention thus provides a sealed equipment box, in particular a splice box, including a first portion having an opening which is closed off in sealed manner by a second portion with which at least one linear gasket is associated, which linear gasket is positioned between the portions in a zone of the first portion against which the second portion abuts at the edge of the opening, and also at least one insertion slot for receiving an electrical and/or optical cable, opening out in the first portion at said edge in the abutment zone against which the second portion abuts, through which zone the linear gasket passes, the slot enabling the cable to be inserted transversely, without any threading being necessary, into the first portion of the box when said box is open.

According to a characteristic of the invention, the first portion of the box carries a sealing neck positioned at an insertion slot so that the neck surrounds said slot except in the direction in which the slot opens out at the edge of the opening, and where said neck is provided with a longitudinal slot enabling the cable to be inserted into it transversely. The neck receives a sealing member, referred to as the "neck gasket", formed by a sleeve, one end of which is provided with a laterally projecting element that is placed at the edge of the opening and in an insertion slot so as to guarantee that the box is sealed at this level by providing continuity for the abutment zone for the linear gasket, when the sleeve as positioned around the cable is pushed into the neck, against the inside wall of which the sleeve abuts in sealed manner under the action of a presser device which is mounted at the end of the neck so as to compress simultaneously the sleeve in the neck and a cable gasket in an axial cavity in the sleeve, said cable gasket being mounted and compressed around the cable inside the axial cavity of the sleeve against which it is pressed in sealed manner.

The box further includes at least one of the following main additional characteristics:

a projecting element of a sealing member, which element is provided with a groove organized to provide continuity for a gasket abutment zone by co-operating with a groove determining an abutment path for a linear gasket at the edge of the opening, the continuity being provided when the sleeve of the sealing member is positioned at the inner end of the sealing neck, the groove carried by the member then being placed between the two groove ends that flank the slot into which the member penetrates;

a linear gasket groove provided on a projecting element of a sealing member and provided with at least one rib projecting from the bottom of the groove, which bottom is situated below the level of the bottom of the continued linear gasket groove, the rib projecting to above said level of the bottom of the continued linear gasket groove between the ends of which the groove in the projecting element is positioned when the sealing member is pressed to the inner end of the sealing neck, so as to enable the linear gasket to abut against two linear zones on either side of the rib, when the second portion is in place on the first portion, and when it presses against said linear gasket;

alternatively, a linear gasket groove provided in a projecting element of a sealing member is provided with at least one channel whose banks slope towards the bottom of the channel, and whose bottom is below the level of the bottom of the groove in the first portion, between the ends of which groove the channel is positioned when the sealing member is pressed to the inner end of the sealing neck, so as to enable the linear gasket to abut against a linear zone on each bank of the channel, when the second portion is in place on the first portion and when it presses on the linear gasket; and a sealing member whose sleeve is at least approximately cylindrical in appearance is provided with sealing beads at that end of the sealing member which penetrates to the inner end of the neck, so as to abut via the beads against the inside sidewall of said neck.

BRIEF DESCRIPTION OF THE DRAWINGS

The invention, its characteristics and advantages are described in more detail in the following description given with reference to the figures, in which:

FIG. 1 is a perspective view of a sealed equipment box made up of two portions and of sealing elements specific to a cable access of the invention, which sealing elements are shown in exploded perspective;

FIG. 2 is a fragmentary section view on I—I of the access shown in FIG. 1, with the sealing elements of the invention being shown in their final position on a cable;

FIG. 3 is a section view on I—I of a sealing member of the invention, referred to as a "neck gasket", and of a box portion with which this member co-operates;

FIG. 4 is a side view in perspective of the neck gasket shown in FIG. 3; and

FIGS. 5 and 6 show respective variant embodiments of a groove continuity element with which a neck gasket is provided for receiving a linear gasket.

MORE DETAILED DESCRIPTION

In this example, the sealed equipment box 1, which is shown open in FIG. 1, is assumed to be a splice box for an optical cable 3 including a plurality of fibers 3', at least some of which are to be tapped individually to respective fibers 4' of at least one branch cable 4. By way of example, it is assumed that two fibers 4' from the branch cable 4 are tapped to one of the fibers 3' of the cable 3 via respective suitable optical modules 5. The design of such a module is not described in detail herein insofar as it is conventional and it has no direct relationship with the subject of the invention.

In the example shown, the box is made up of a first portion 6 comprising a hollow body, and of a second portion 7 forming a lid suitable for closing off an opening of the hollow body in sealed manner, the body and the lid being made, for example, of a molded material. A linear gasket 8 of given initial diameter is provided that is positioned in a zone in which the lid 7 bears against the edge of the opening of the hollow body so as to guarantee that the lid 7 closes the hollow body 6 in sealed manner. In the example shown, the linear gasket 8 is assumed to be received in a peripheral groove 9 in the hollow body, which groove surrounds the opening that the lid 7 closes. The lid is assumed to be provided with a peripheral rib shown, in particular, in profile and in section in FIG. 5. When the hollow body of the box is closed by the lid 7, this rib penetrates into the peripheral groove in the hollow body and presses against the gasket 8 for sealing purposes. For example, the lid 7 may be fixed by means of screws passing through suitable holes 10 so as to screw into tapped bores 11 provided in the hollow body around the periphery of the opening. In this example, the bores are provided beyond the peripheral groove 9 for sealing purposes.

In the example shown, the cable 3 passes through the box 1 and, for this purpose, the hollow body is provided with two cable insertion slots provided in parallel manner in respective ones of opposite walls, only one of these insertion slots, referenced 12, being shown empty in FIG. 1, while the parallel slot is shown occupied in a manner described in more detail below. Each of the two insertion slots provided for passing the same cable opens out in the edge of the opening of the hollow body, and, in this example, in the edge of the peripheral groove 9, through which it passes, in an abutment zone provided for the lid. This configuration makes it possible to insert a cable transversely into the hollow body when the opening is not closed off by the lid 7.

As is known, it is possible to break out at least some of the fibers of a cable from the common sheath that surrounds them in the cable, so as to connect them to other fibers from one or more branch cables 4 in connection modules 5, as shown for the fibers referenced 3' coming from the cable 3, and, in this example, assumed to be connected to respective fibers 4' of a branch cable 4 in one of the connection modules 5. In this example, the connection modules are assumed to be stacked on a carrying plate 13 hinged to two elements 14 of a support structure fixed in the box. This hinging makes it possible for the plate 13 to pivot, e.g. through 180°, from an open position in which the connection modules 5 are accessible from outside the box to a closed position in which the modules are received in the hollow body 6 which can then be closed by means of the lid 7. In the embodiment shown, each element 14 terminates at the edge of the cable-passing slot 12 so that it flanks said slot, and it is supplemented by an auxiliary carrying-plate support 15 fixed in the hollow body and situated on the other side of the slot 12 in question.

For sealing reasons, the box of the invention is provided with a "sealing" neck 16 projecting out from the hollow body at each of the slots 12 that are provided to enable the cable to be inserted transversely to pass through the hollow body without being threaded. Each insertion neck 16 is split longitudinally so as to provide an unobstructed cable passage corresponding to the slot 12 in the hollow body, the neck being placed against the slot at the mouth thereof, which mouth is situated at the edge of the opening of the hollow body.

The cable access provided at a box 1 via a slot 12 and via split neck 16 involves implementing special stuffing means to enable a cable to pass through the box in sealed manner.

In a known variant embodiment, commonly-used stuffing means comprise a "cable" gasket designed to surround a cable against which it is pressed under the action of a presser device that is positioned on the neck. The neck receives the cable gasket, and the cable passes through the neck.

In the embodiment shown, the cable gasket, referenced 17, is preferably a split gasket, thereby making it possible to mount it transversely at any point along the cable, without it having to be threaded over the cable from one end thereof. In the embodiment shown, the cable gasket 17 is a cylindrical gasket, e.g. made of an elastomer material of low hardness, whose outside diameter is determined. Cable gaskets of various inside diameters are provided for the same outside diameter, so that cables of various diameters can be mounted in same-size accesses, two gaskets 17 and 17' of different inside diameters being shown in FIG. 1.

In the embodiment shown, a cable gasket 17 or 17' is received in a sealing member 18, referred to as a "neck gasket" herein, including a portion formed by a cable-receiving sleeve 19 which is organized to be suitable for penetrating into a neck 16.

The example of the neck gasket 18 shown in FIGS. 1 to 4 is in the form of a hollow sleeve 19 that is substantially cylindrical in appearance, and that is provided with a laterally-projecting element 20 at one of its ends.

This element is designed to be positioned at the inner end of the split neck, facing the inside of the box, when the neck gasket is in place. It is axially provided with a through duct 21 organized to allow a cable 3 to pass through it, the duct 21 is extended by an axial cylindrical cavity 22 going towards the other end of the sleeve 19. The cavity 22 is organized to receive a cable gasket 17 inserted axially therein, and it therefore opens out to the outside of the sleeve for this purpose.

In a preferred embodiment, the sleeve 19 is split radially over its entire length so that it can be mounted transversely on a cable 3, at any point, without having to be threaded over one of the ends of said cable.

At least over a portion of its length, the sleeve 19 is cylindrical in appearance and has an outside diameter slightly smaller than the diameter of a neck portion 12 into which it is suitable for being slid so as to close off said neck portion.

In the example shown in FIGS. 3 and 4, the sleeve 19 of a neck gasket 18 is provided with a series of peripheral beads 23, that are parallel in this example, and that are provided in relief over most of its periphery, in the vicinity of that one of its ends which is designed to be inserted first into the neck 12 in which the sleeve is received. The beads 23 are crushed against the inside wall of the neck, and they participate in providing sealing at this level, when the neck gasket is in position on a cable 3 entering into the box via the access of which the neck 12 in question is part.

To this end, in a preferred embodiment, the material of the hollow body 6 and in particular of the necks 18 provided thereon is a thermoplastic material whose hardness is greater than the hardness of the material used for a neck gasket 18 which is itself harder than the material used for a cable gasket 17.

The projecting element 20 situated at one of the ends of the neck gasket is provided with a groove 24 which is designed to be placed in the mouth of a slot 12 between two ends of the groove 9, which ends are situated on either side of the mouth of the slot. This groove 24 provides continuity for the abutment path formed by the groove 9 for the gasket 8. As indicated above, it is possible to use one or optionally more than one gasket portion around the periphery of a opening of the hollow body as a function of particular constraints which are not described in any more detail herein. In which case, the grooved projecting element provides path continuity for any gasket element 8 that is positioned at the mouth of a slot 12.

In the embodiment shown, the projecting element 20 of a neck gasket 18 is provided with a groove 24 formed transversely relative to the longitudinal axis of the gasket between an "end" projection 20A and an "abutment" projection 20B of the element. The end projection 20A is shaped to be suitable for being slid between the edges of a slot 12 and more particularly between the two groove ends 9 flanking said slot. When a neck gasket is pushed into a split neck, the abutment projection 20B serves to position the groove 24 of the projecting element 20 of the neck gasket in alignment with the groove 9 in the vicinity of which the split neck 16 is situated. To this end, the abutment projection 20B may, for example, come into abutment against the outside wall of the hollow body that carries the neck 16 in the vicinity of the slot 12 associated with said neck. In the embodiment shown, the abutment projection 20B is made up of two portions which are organized to overlie the edges of the longitudinal slot in a neck 16 when the sleeve 20 that carries the projection is inserted into the neck, and also to abut against respective edges of a slot 12 in the hollow body. The projecting element 20, and in particular the projection 20B are dimensioned in known manner so that the groove 24 in the projecting element 20 is systematically positioned in alignment with a groove 9.

In addition, because the manufacturing tolerances for the neck gasket 18 and for the hollow body 6 need not be the same, it impossible to be sure that the bottoms of the grooves 9 and 24 are at the same level in the zone in which the bottoms are adjacent to each other when the neck gasket is in place.

As a result, the neck gasket is designed so that the bottom of a groove 24 is always positioned at a level slightly lower than the level of the interrupted groove 9, the gap in which is to be bridged by the groove 24. The bottom of the groove 24 is shaped so as to receive a linear gasket 8 in abutment against at least two linear and longitudinal sealing zones when the gasket 8 is pressed by the lid 7 of the box into the groove 9 and into the groove 24 in the projecting element 20 in question. In a first variant embodiment, good sealing may be obtained by providing at least one longitudinal rib 25 on the bottom of the groove 24, which rib is positioned so as to face the gasket-pressing rib 26 on the lid at this level, as shown in FIG. 5. The sealing gasket 8 between the lid and the hollow body is then compressed in the groove when the lid is pushed shut, and its bottom presses on either side of the rib against two linear abutment zones.

In a second variant embodiment, this may also be obtained by providing a longitudinal channel 27 having banks sloping towards the bottom of the channel, e.g. a V-shaped channel as shown in FIG. 6. The channel 27 is also positioned so as to face the gasket-pressing rib 26 on the lid at this level, as shown in FIG. 6. The sealing gasket 8 between the lid and the hollow body is then compressed in the groove when the lid is pushed closed, and it presses against the two banks of the channel 27 along a linear abutment zone.

In the invention, and as shown in FIG. 2, a neck gasket is held in position and compressed in a split neck 16 by means of a presser device which is preferably made up of distinct portions organized to be coupled together around the cable 3.

This presser device comprises a nut made up of two distinct complementary portions 28A, 28B organized to be coupled together around a cable 3 so as to constitute a nut that can be screwed onto the end of a neck 12. The nut is designed to compress the sleeve 19 of a neck gasket 18 in the neck onto which it is screwed, and also, simultaneously, to compress a cable gasket 17 firstly onto the cable 3 passing through the gasket, and secondly into the axial cavity 22 of the sleeve 19 with the assistance of a presser socket made up of two distinct complementary portions 30A, 30B organized to be coupled together around the cable 3.

The presser socket is split longitudinally into two portions 30A, 30B, it has a projecting central cylindrical portion making it possible to come into peripheral abutment on one side against an internal abutment ring 30A0, 30B0 provided in a nut 28A, 28B, and on the other side against a sleeve 19 via a cylindrical portion, referenced 30A2, 30B2 in this example. This cylindrical portion has an outside diameter smaller than the outside diameter of the central cylindrical portion. Another cylindrical portion 30A1, 30B1 is situated on the other side of the central portion from the portion 30A2, 30B2, and having the same outside diameter and a different length, so that the socket can be turned around and used with cable gaskets of two different lengths. That end of the cylindrical socket portion, such as the portion 30A2, 30B2 in FIG. 2, which presses against a cable gasket 17 pushed into a neck 12 presses said cable gasket firstly against the cable 3 surrounded by said gasket, and secondly against the wall of the neck gasket 19 in which said cable gasket is received in the neck 12, when the nut 28A, 28B is screwed onto said neck. In this example, this pressure is limited by the cylindrical portion 30A2, 30B2 coming into abutment at the end of the neck 12. The neck gasket 19 is held stationary against the outside wall of the box in the neck 12 by the abutment projection 20B with which it is provided abutting against said wall. The gasket 8 can then be positioned in the groove 9 in the box and in the groove 24 in the neck gasket which completes said groove in the box, and the box can be closed in sealed manner by positioning the lid 7 on it.

What is claimed is:

1. A sealed equipment box, in particular a splice box, including a first portion having an opening which is closed off in sealed manner by a second portion with which at least one linear gasket is associated, which linear gasket is positioned between the portions in a zone of the first portion against which the second portion abuts at the edge of the opening, and also at least one insertion slot for receiving an electrical and/or optical cable, opening out in the first portion at said edge in the abutment zone against which the second portion abuts, through which zone the linear gasket passes, the slot enabling the cable to be inserted transversely, without any threading being necessary, into the first portion of the box when said box is open, wherein the first portion carries a sealing neck positioned at an insertion slot so that the neck surrounds said slot except in the direction in which the slot opens out at the edge of the opening, and where said neck is provided with a longitudinal slot enabling the cable to be inserted into it transversely, and wherein the neck receives a sealing member, referred to as the "neck gasket", formed by a sleeve, one end of which is provided with a laterally projecting element that is placed at the edge of the opening and in an insertion slot so as to guarantee that the box is sealed at this level by providing continuity for the abutment zone for the linear gasket, when the sleeve as positioned around the cable is pushed into the neck, against the inside wall of which the sleeve abuts in sealed manner under the action of a presser device which is mounted at the end of the neck so as to compress simultaneously the sleeve in the neck and a cable gasket in an axial cavity in the sleeve, said cable gasket being mounted and compressed around the cable inside the axial cavity of the sleeve against which it is pressed in sealed manner.

2. A box according to claim 1, including a projecting element of a sealing member, which element is provided with a groove organized to provide continuity for a gasket abutment zone by co-operating with a groove determining an abutment path for a linear gasket at the edge of the opening, the continuity being provided when the sleeve of the sealing member is positioned at the inner end of the sealing neck, the groove carried by the member then being placed between the two groove ends that flank the slot into which the member penetrates.

3. A box according to claim 2, wherein the linear gasket groove provided on a projecting element of a sealing member is provided with at least one rib projecting from the bottom of the groove, which bottom is situated below the level of the bottom of the continued linear gasket groove, the rib projecting to above said level of the bottom of the continued linear gasket groove between the ends of which the groove in the projecting element is positioned when the sealing member is pressed to the inner end of the sealing neck, so as to enable the linear gasket to abut against two linear zones on either side of the rib, when the second portion is in place on the first portion, and when it presses against said linear gasket.

4. A box according to claim 2, wherein the linear gasket groove provided in a projecting element of a sealing member is provided with at least one channel whose banks slope towards the bottom of the channel, and whose bottom is below the level of the bottom of the groove between the ends of which the channel is positioned when the sealing member is pressed to the inner end of the sealing neck, so as to enable the linear gasket to abut against a linear zone on each bank of the channel, when the second portion is in place on the first portion and when it presses on the linear gasket.

5. A box according to claim 1, including a sealing member whose sleeve, which is at least approximately cylindrical in appearance, is provided with sealing beads at that end of the sealing member which penetrates to the inner end of the neck, so as to abut via the beads against the inside sidewall of said neck.

6. A box according to claim 1, including at least one cable gasket and a sealing member, these elements being radially split over their entire lengths so that they can be mounted on a cable by transverse insertion without having to be threaded over the cable, as well as a presser device at least initially made up of distinct portions organized to be coupled together around a cable.

7. A box according to claim 1, including a presser device incorporating a nut which is made up of two distinct complementary portions which are organized to be coupled together around a cable and which are screwed onto the end of a neck so as to compress, simultaneously, a sleeve of a sealing member in the neck, and a cable gasket on the cable and in an axial cavity in the sleeve, with the assistance of a presser socket made up of two distinct complementary portions organized to be coupled together around the cable.

8. A box according to claim 7, including a presser socket that is longitudinally split into two portions, that has a projecting central cylindrical portion that enables it to come into peripheral abutment on one side against an internal abutment ring provided in a nut and on the other side against a sealing member sleeve, the projecting central portions being flanked by two cylindrical portions of smaller diameter and of different lengths, either of which can be used to press against one end of a cable gasket under the effect of the nut being screwed onto a neck carrying it.

* * * * *